United States Patent
Yi et al.

(10) Patent No.: US 9,930,629 B2
(45) Date of Patent: Mar. 27, 2018

(54) METHOD AND APPARATUS FOR WIRELESS COMMUNICATION WITH DUAL CONNECTIVITY

(71) Applicant: LG ELECTRONICS INC., Seoul (KR)

(72) Inventors: Yunjung Yi, Seoul (KR); Joonkui Ahn, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 21 days.

(21) Appl. No.: 15/034,279

(22) PCT Filed: Nov. 5, 2014

(86) PCT No.: PCT/KR2014/010594
§ 371 (c)(1),
(2) Date: May 4, 2016

(87) PCT Pub. No.: WO2015/069026
PCT Pub. Date: May 14, 2015

(65) Prior Publication Data
US 2016/0278032 A1    Sep. 22, 2016

Related U.S. Application Data

(60) Provisional application No. 61/900,327, filed on Nov. 5, 2013.

(51) Int. Cl.
*H04W 56/00* (2009.01)
*H04W 16/32* (2009.01)
(Continued)

(52) U.S. Cl.
CPC ....... *H04W 56/0005* (2013.01); *H04L 5/0048* (2013.01); *H04L 69/324* (2013.01);
(Continued)

(58) Field of Classification Search
CPC ... H04L 1/0028; H04L 1/0026; H04L 1/1861; H04L 27/2613; H04L 5/005;
(Continued)

(56) References Cited

U.S. PATENT DOCUMENTS

| | | | |
|---|---|---|---|
| 2006/0018276 A1 | 1/2006 | Kim et al. | |
| 2010/0062783 A1* | 3/2010 | Luo | H04J 11/0069 455/450 |

(Continued)

FOREIGN PATENT DOCUMENTS

WO    WO 2012/131857 A1    10/2012

*Primary Examiner* — Jung-Jen Liu
(74) *Attorney, Agent, or Firm* — Birch, Stewart, Kolasch & Birch, LLP

(57) ABSTRACT

A method and an apparatus for wireless communication with dual connectivity are described. The apparatus supports dual connectivity with a first cell and a second cell and the apparatus comprises a radio frequency (RF) and a processor operatively coupled to the RF unit. The second cell is an overlaid virtual cell which is formed by collaborating the first cell and cell ID of the second cell is different from physical cell ID of the first cell when the processor uses primary synchronization signal (PSS), secondary synchronization signal (SSS) or cell-specific common reference signal (CRS) as synchronization signal for the second cell.

12 Claims, 11 Drawing Sheets

(51) Int. Cl.
  *H04W 16/12* (2009.01)
  *H04L 5/00* (2006.01)
  *H04L 29/08* (2006.01)
  *H04W 76/04* (2009.01)
  *H04W 84/04* (2009.01)
  *H04W 88/06* (2009.01)

(52) U.S. Cl.
  CPC ........... *H04W 16/12* (2013.01); *H04W 16/32* (2013.01); *H04W 76/046* (2013.01); *H04W 84/045* (2013.01); *H04W 88/06* (2013.01)

(58) Field of Classification Search
  CPC .... H04L 5/0035; H04L 5/0051; H04W 48/20; H04W 72/0406; H04W 72/082; H04W 16/32; H04W 16/24; H04W 48/10; H04J 11/0079; H04B 7/024; Y02B 60/50
  See application file for complete search history.

(56) References Cited

U.S. PATENT DOCUMENTS

| | | | |
|---|---|---|---|
| 2012/0015655 A1* | 1/2012 | Lee | H04W 8/02 455/435.1 |
| 2012/0039226 A1 | 2/2012 | Yang et al. | |
| 2013/0170449 A1* | 7/2013 | Chen | H04L 1/0038 370/329 |
| 2013/0235821 A1* | 9/2013 | Chen | H04W 72/0406 370/329 |
| 2013/0250874 A1* | 9/2013 | Luo | H04W 72/04 370/329 |
| 2013/0258884 A1 | 10/2013 | Xu et al. | |
| 2013/0258979 A1 | 10/2013 | Hulkkonen et al. | |
| 2013/0315195 A1* | 11/2013 | Ko | H04W 72/082 370/329 |
| 2014/0022998 A1 | 1/2014 | Tajima et al. | |
| 2014/0302863 A1* | 10/2014 | Chen | H04W 24/02 455/452.1 |

* cited by examiner

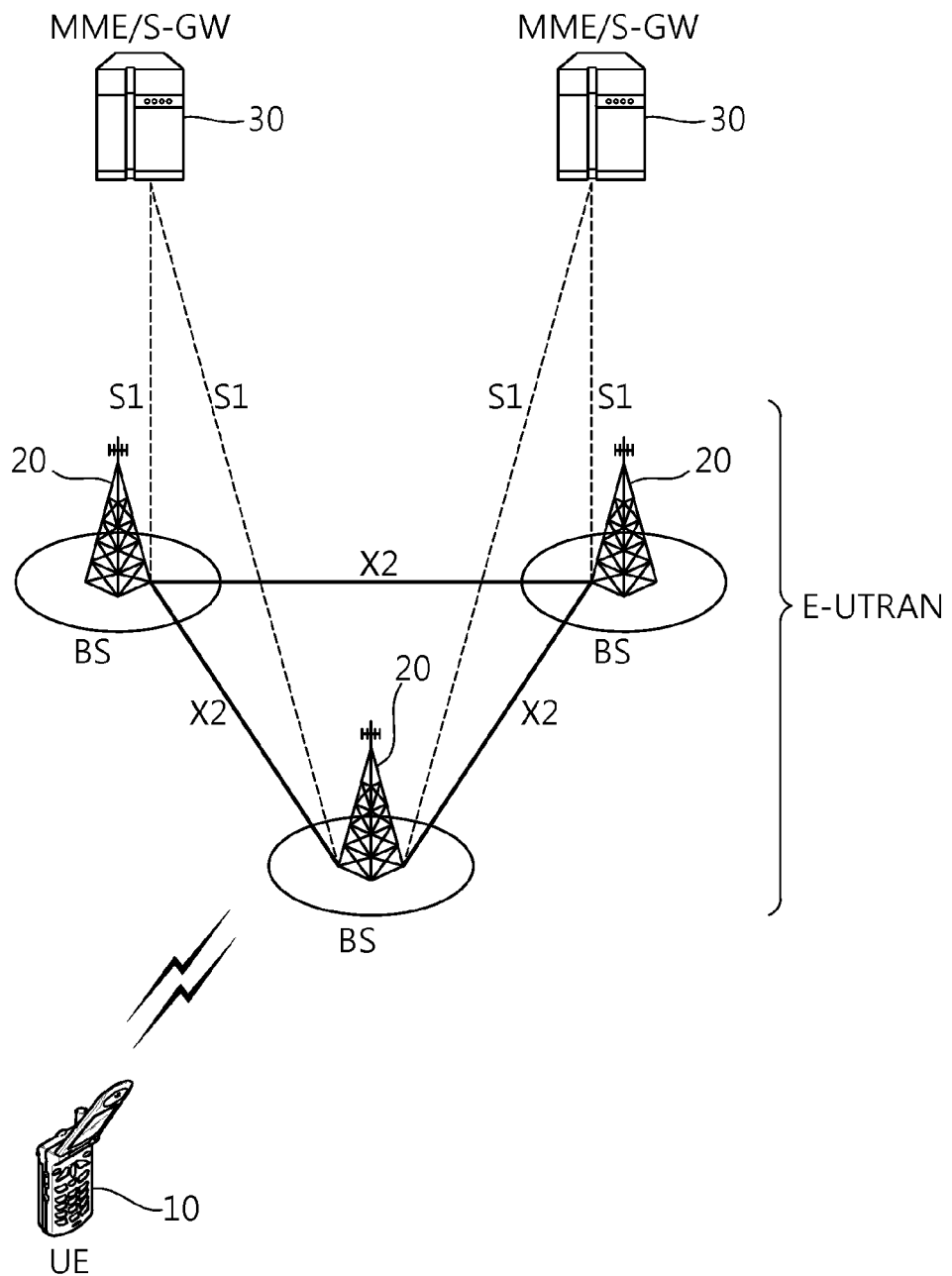
[Fig. 1]

[Fig. 2]
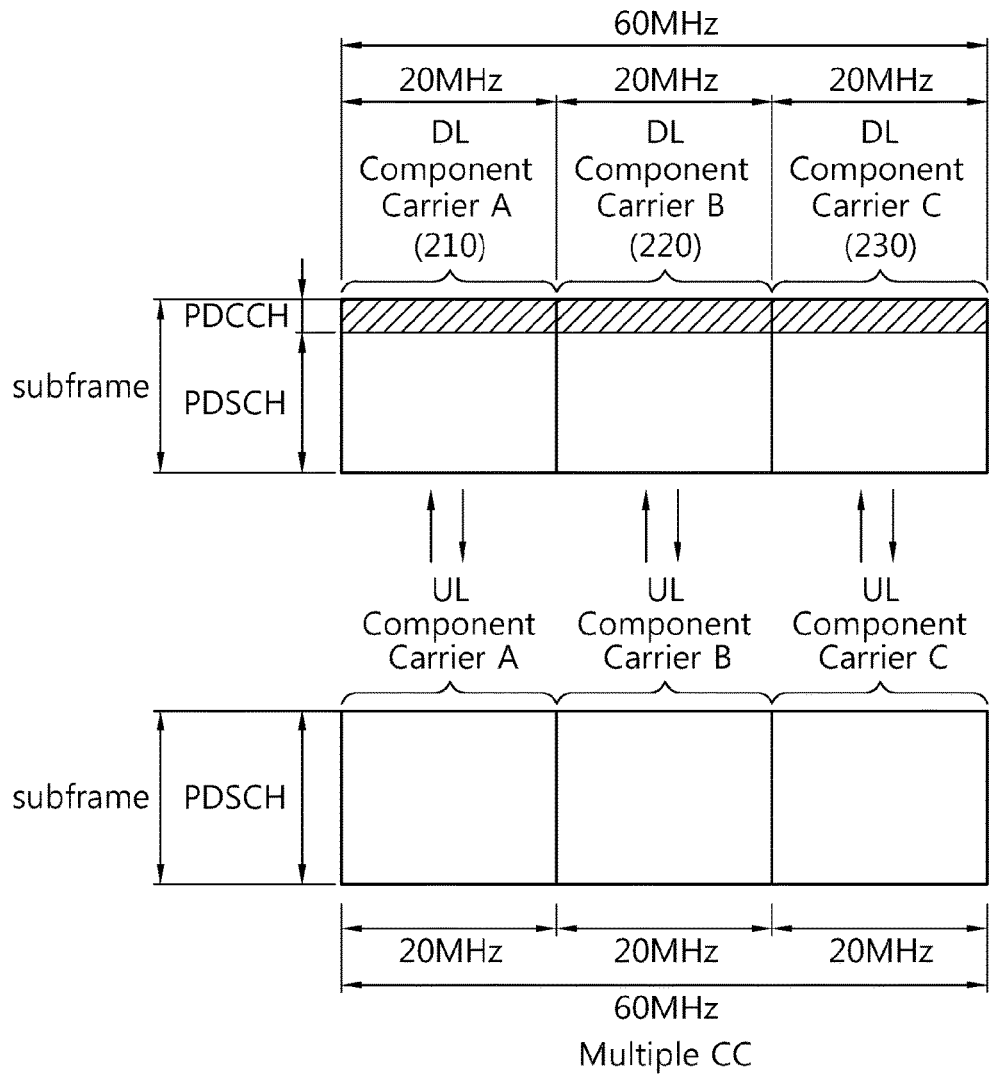
Multiple CC
[Fig. 3]
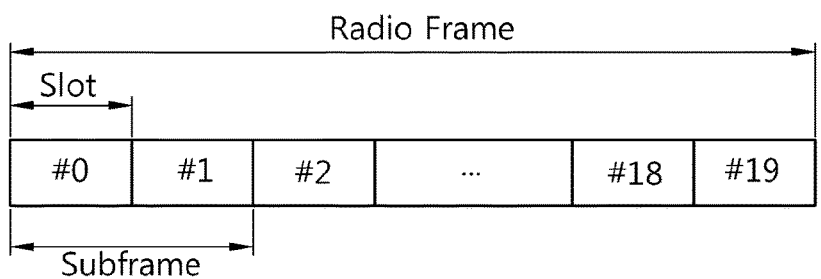

[Fig. 4]
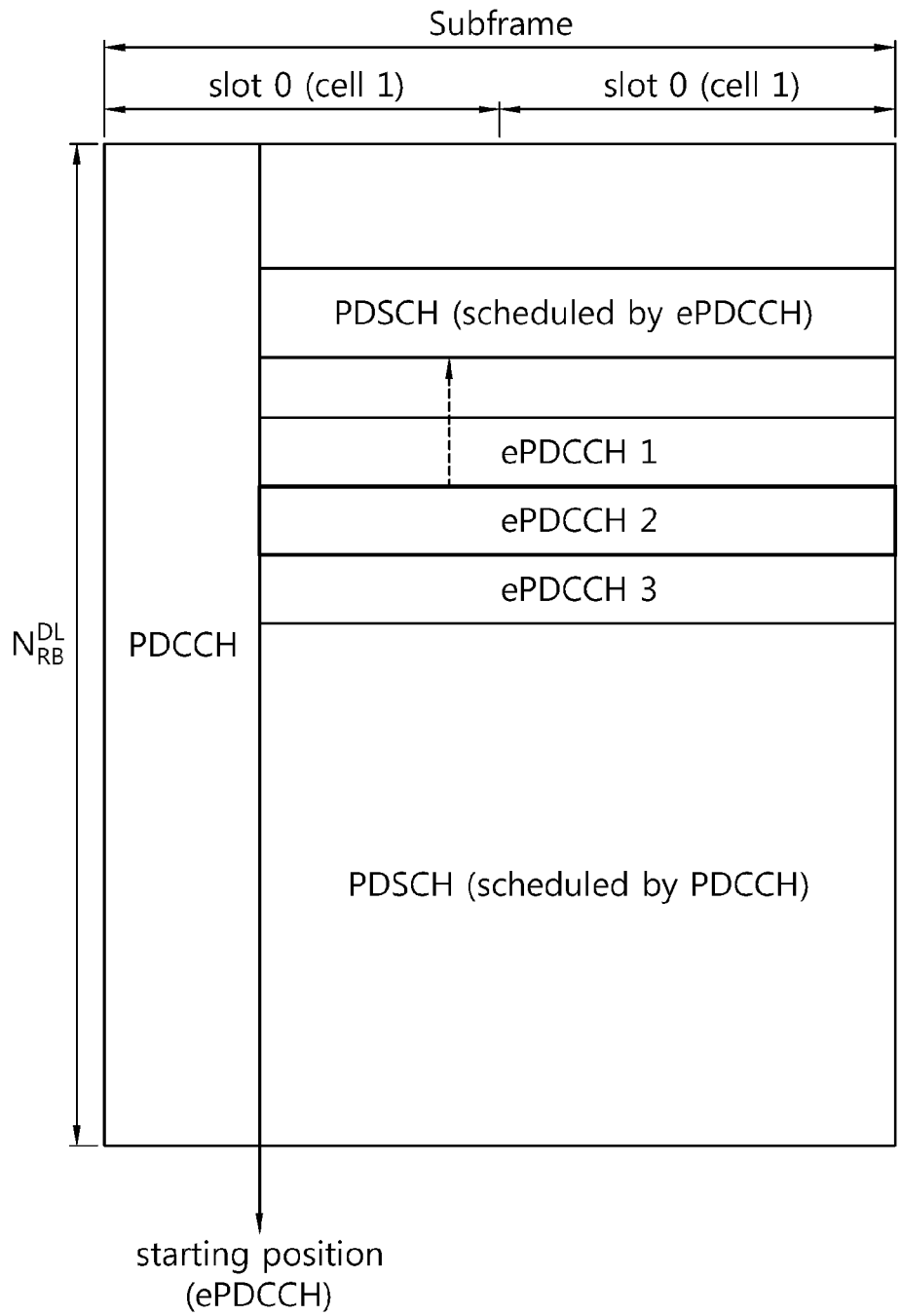

[Fig. 5]
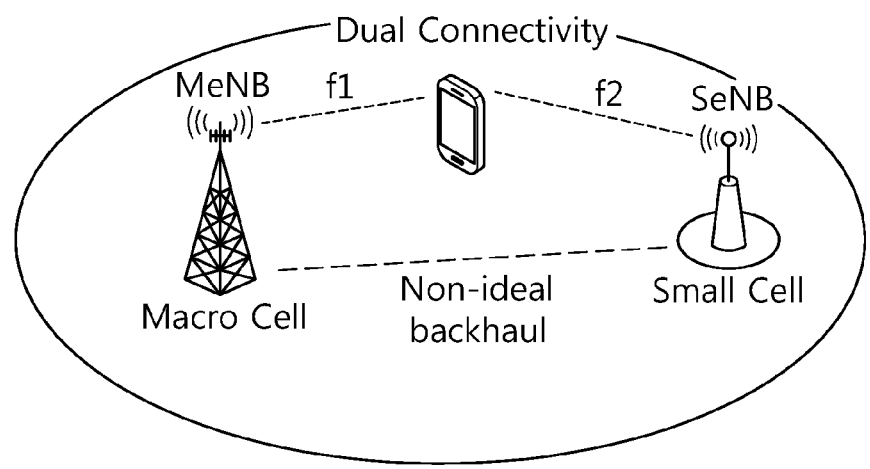

[Fig. 6]
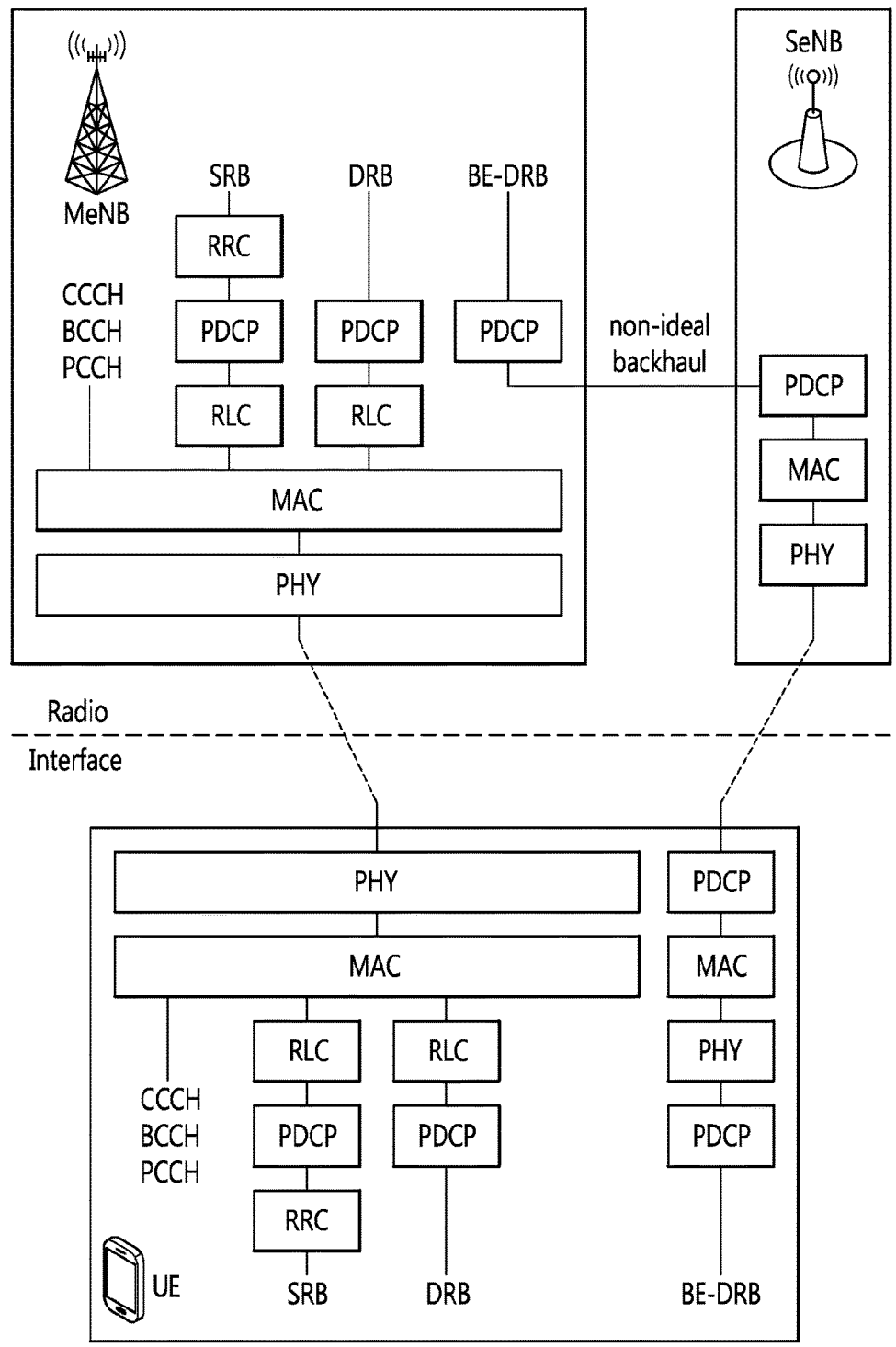

[Fig. 7]
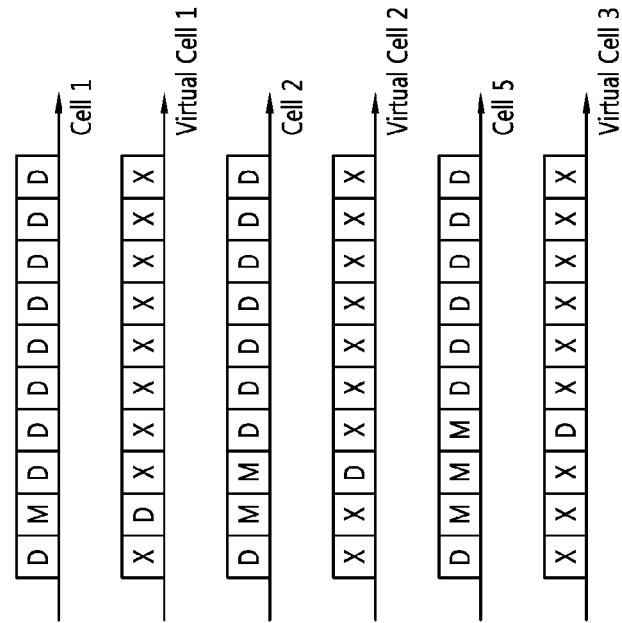
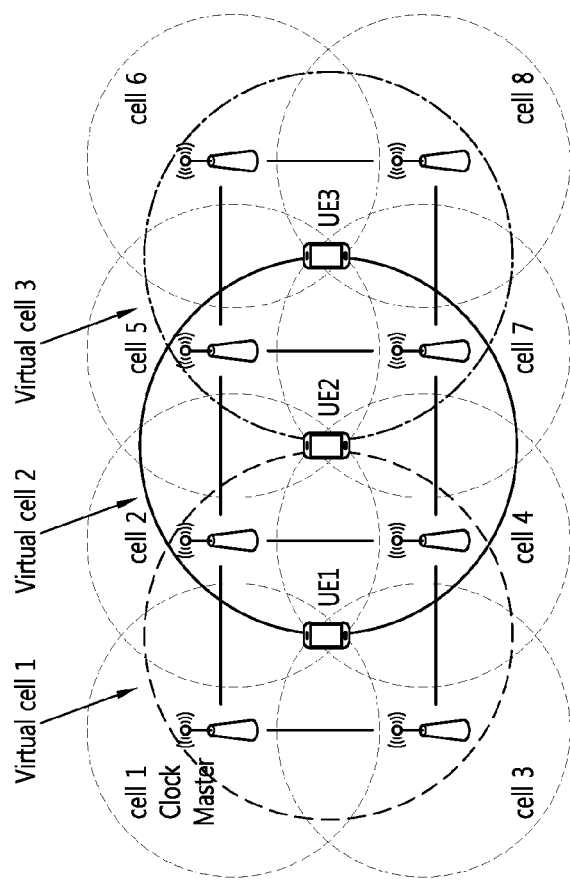

[Fig. 8]
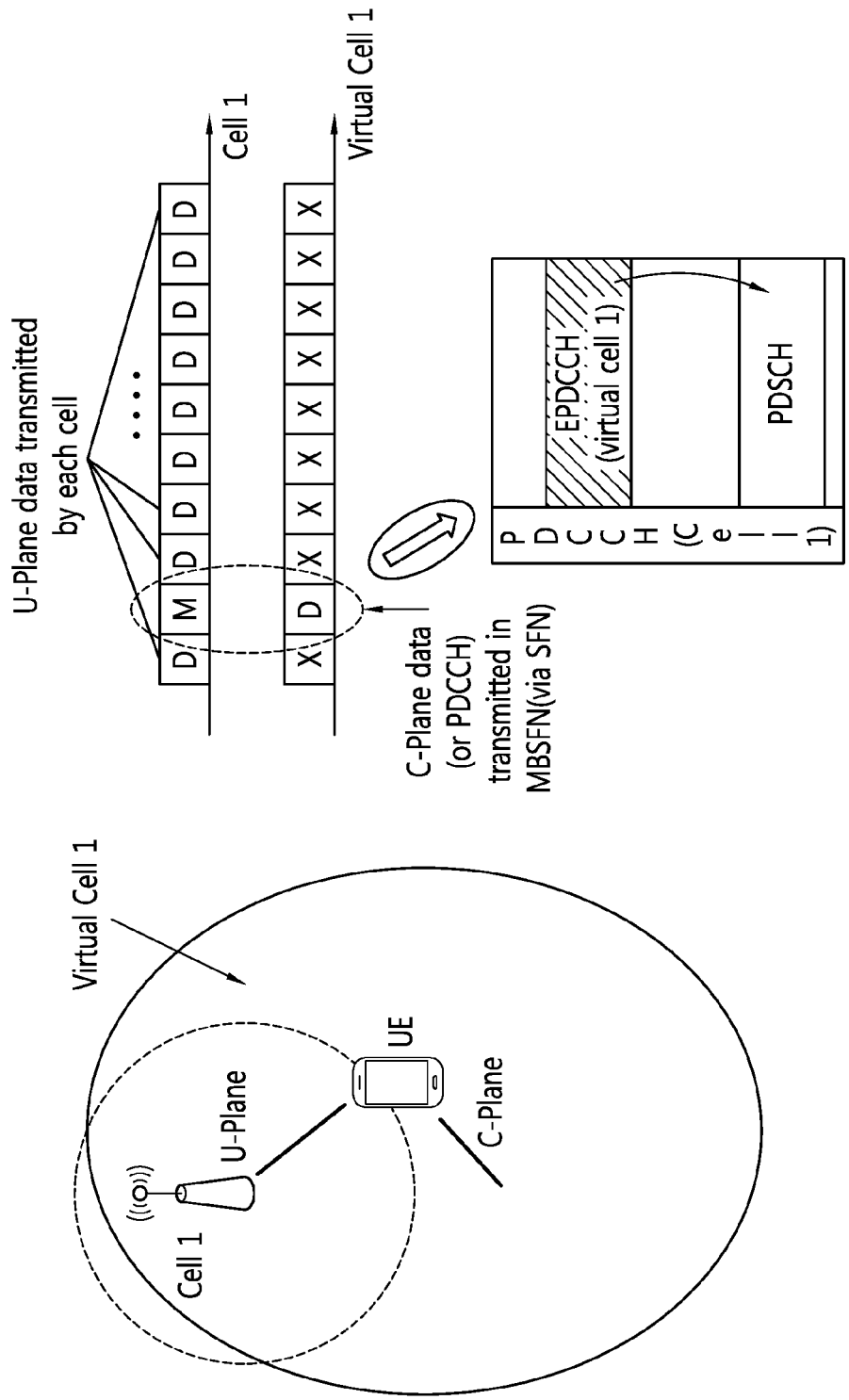

[Fig. 9]
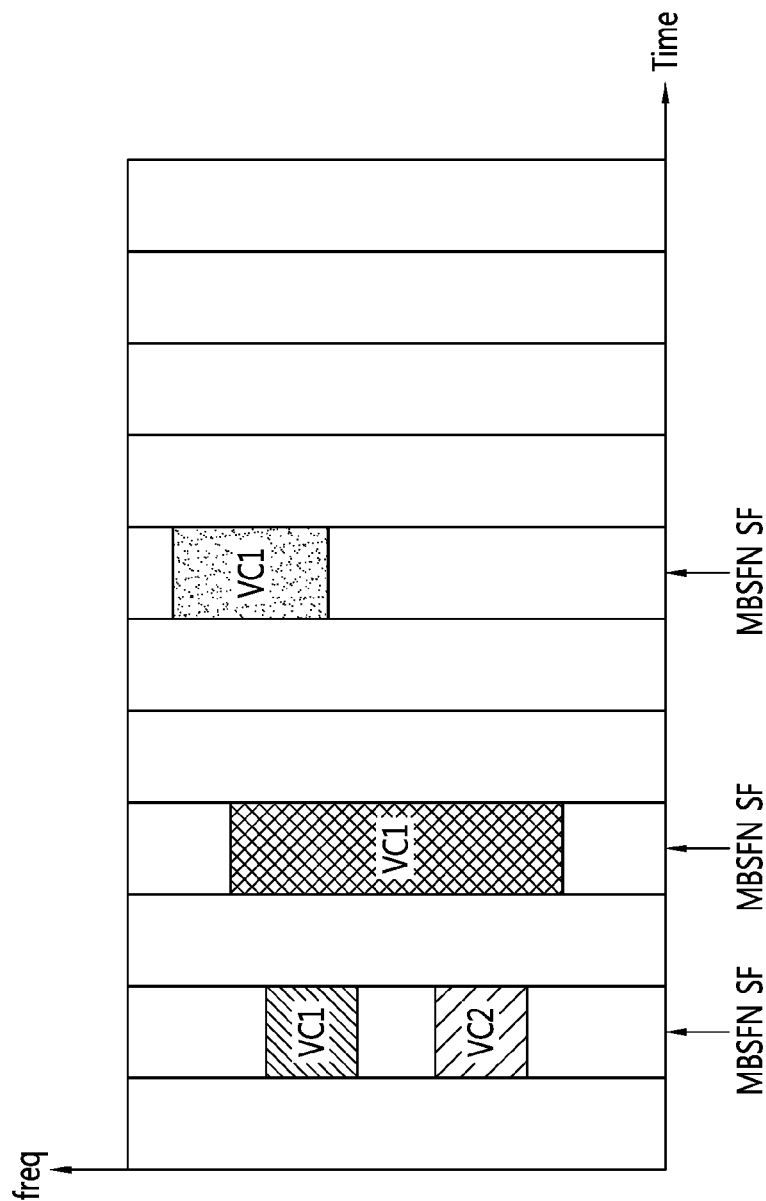

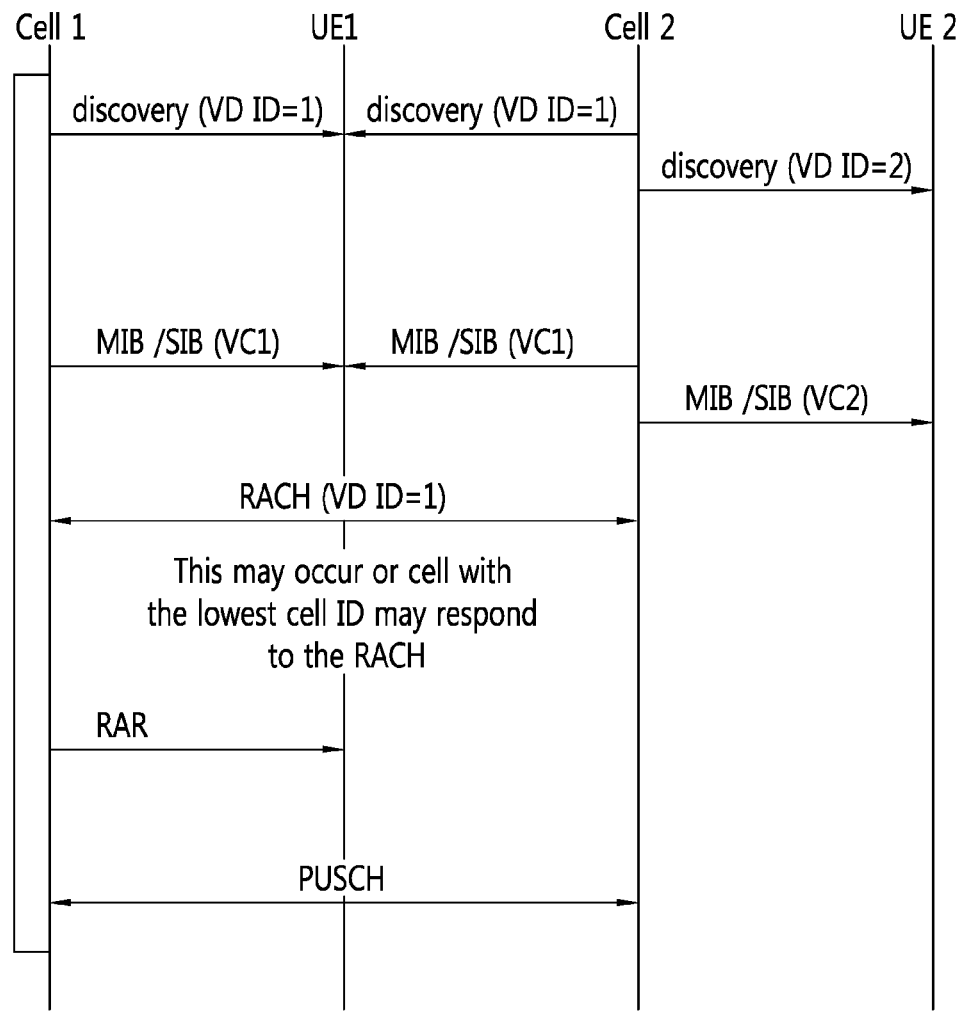
[Fig. 10]

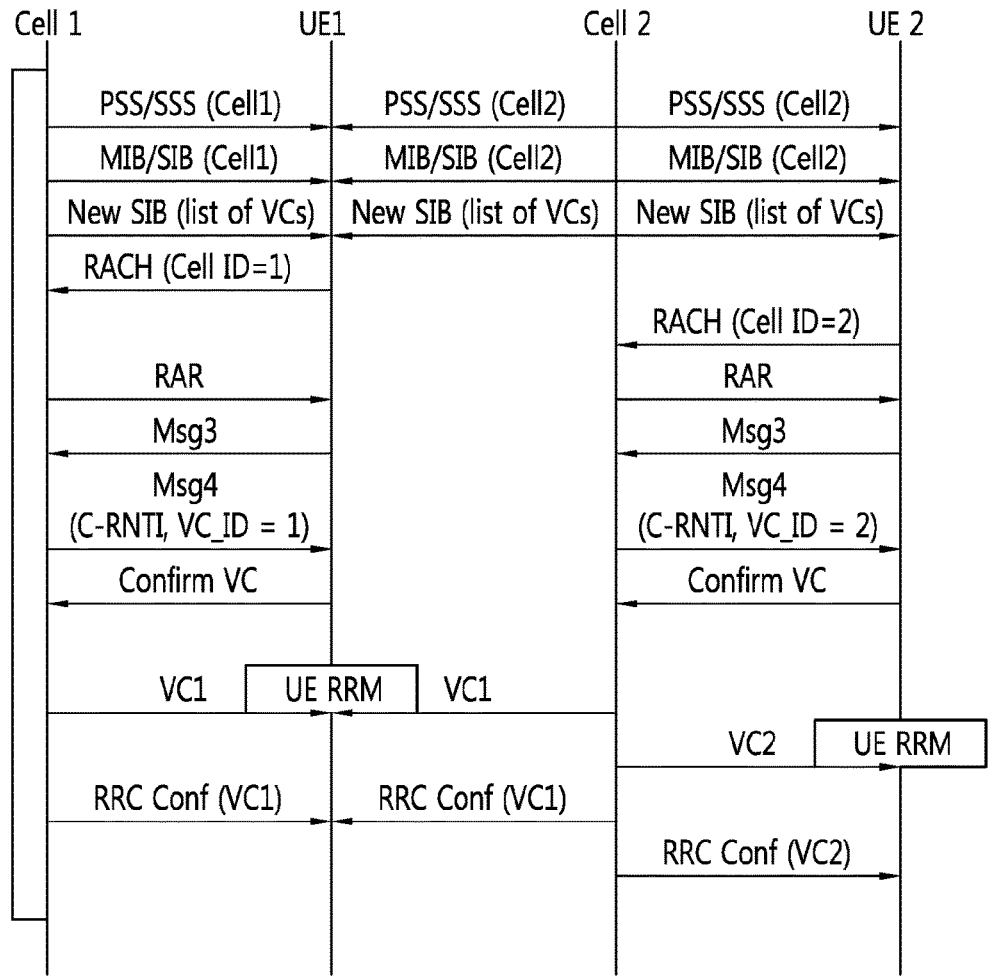
[Fig. 11]
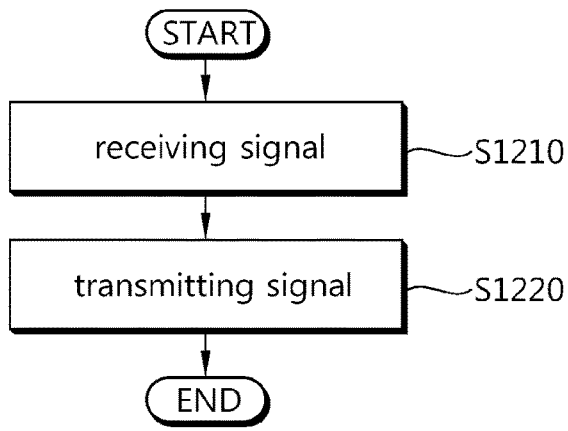
[Fig. 12]

[Fig. 13]
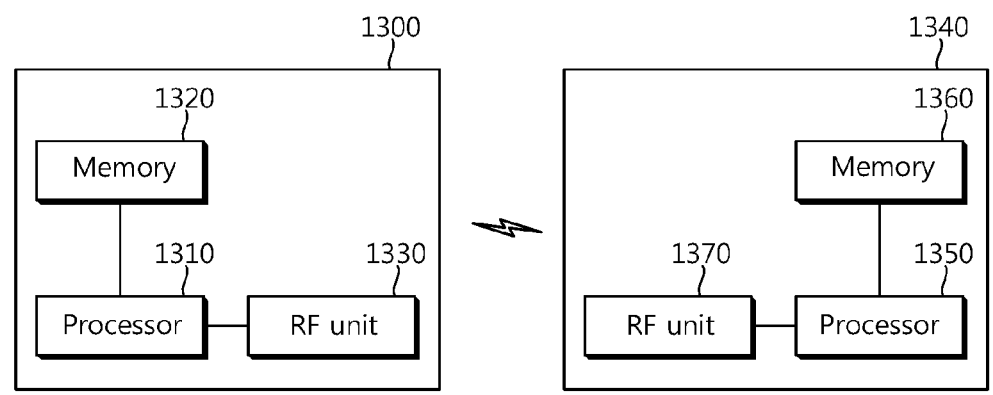

METHOD AND APPARATUS FOR WIRELESS COMMUNICATION WITH DUAL CONNECTIVITY

CROSS REFERENCE TO RELATED APPLICATIONS

This application is the National Phase of PCT/KR2014/010594 filed on Nov. 5, 2014, which claims priority under 35 U.S.C. § 119(e) to U.S. Provisional Application No. 61/900,327 filed on Nov. 5, 2013, all of which are hereby expressly incorporated by reference into the present application.

TECHNICAL FIELD

This invention relates to wireless communication, more specifically to techniques for supporting dual connectivity among small cells via MBSFN subframes.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology or resource aggregation over intra-node carriers or inter-node carriers aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). For inter-node resource aggregation, for each node, carrier group (CG) can be established where one CG can have multiple CCs. Each CC is defined by a single bandwidth and a center frequency.

Recently, in addition to carriers in licensed band, carriers in unlicensed band are also considered for carrier aggregation. In this case, a UE can be configured with zero or more carriers in licensed band and zero or more carriers in unlicensed band. Due to its nature of unlicensed band where the medium is shared by multiple devices and thus continuous transmission is not easily feasible, it is very natural to assume that discontinuous transmission from an eNB operating in unlicensed band. The inventions embodied in this application are applied to carriers in unlicensed band A system in which data is transmitted and/or received in a broadband through a plurality of CCs is referred to as a multi-component carrier system (multi-CC system) or a CA environment. A system in which data is transmitted and/or received in a broadband through a plurality of CGs is referred to as a inter-node resource aggregation or dual connectivity environment. The multi-component carrier system and dual connectivity system perform both a narrow band and a broad band by using one or more carriers. For example, when an each carrier corresponds to a bandwidth of 20 MHz, a bandwidth of a maximum of 100 MHz may be supported by using five carriers.

SUMMARY OF INVENTION

Technical Problem

An object of the present invention is to provide method and apparatus for dual connectivity with virtual cell. An another object of the present invention is to provide method and apparatus for obtaining control information from virtual cell.

Another object of the present invention is to provide method and apparatus for reducing complexity and load in dual connectivity.

Solution to Problem

An embodiment of the present invention is a user equipment (UE) supporting dual connectivity with a first cell and a second cell. The UE comprises a radio frequency (RF) unit for transmitting and receiving a radio signal, and a processor operatively coupled to the RF unit, wherein the processor is configured for transmitting signals via the RF unit based on a scheduling for UL and/or DL, wherein the RF unit transmits and/or receive one of or both of the first cell and the second cell, and wherein the second cell is an overlaid virtual cell which is formed by collaborating the first cell and cell ID of the second cell is different from physical cell ID of the first cell when the processor uses primary synchronization signal (PSS), secondary synchronization signal (SSS) or cell-specific common reference signal (CRS) as synchronization signal for the second cell.

Another embodiment of the present invention is a method of wireless communication with dual connectivity with a first cell and a second cell. The method comprises receiving signal from at least one cell among cells including the first cell and the second cell, and transmitting signal to at least one cell among cells including the first cell and the second cell, wherein the first cell is a macro cell and cell ID of the second cell is different from physical cell ID when the processor uses primary synchronization signal (PSS), secondary synchronization signal (SSS) or cell-specific common reference signal (CRS) as synchronization signal for the second cell.

Advantageous Effects of Invention

According to the present invention, dual connectivity can be supported by a set of small cells with forming an overlaid virtual cell by collaboration among small cells.

According to the present invention, mobility handling can be handled by the overlaid virtual cell and control information can be obtained from virtual cell under dual connectivity.

According to the present invention, it is possible to apply dual connectivity in one frequency with a set of small cells and minimize the handover frequency among small cells and maximize the spectral efficiency in dual connectivity.

BRIEF DESCRIPTION OF DRAWINGS

FIG. 1 shows a wireless communication system to which the present invention is applied.

FIG. 2 shows an exemplary concept for a carrier aggregation (CA) technology according to an exemplary embodiment of the present invention.

FIG. 3 shows a structure of a radio frame to which the present invention is applied.

FIG. 4 shows downlink control channels to which the present invention is applied.

FIG. 5 shows an example of dual connectivity to a macro cell and a small cell.

FIG. 6 shows an example of a protocol architecture supporting dual connectivity.

FIG. 7 briefly describes an exemplary usage of virtual cell via MBSFN subframe according to the present invention.

FIG. 8 briefly describes an example of dual connectivity according to the present invention.

FIG. 9 briefly describes an example of virtual cell region in time/frequency domain according to the present invention.

FIG. 10 briefly describes an example of initial access diagram according to the present invention.

FIG. 11 describes briefly another example of accessing a virtual cell according to the present application.

FIG. 12 is a flowchart briefly describing an operation of a UE according to the invention(s) in this disclosure.

FIG. 13 is a block diagram which briefly describes a wireless communication system

MODE FOR THE INVENTION

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

FIG. 2 shows an exemplary concept for a carrier aggregation (CA) technology according to an exemplary embodiment of the present invention.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a PCell (primary serving cell) is a resource in which the UE initially establishes a connection (or a RRC connection) among several serving cells. The PCell serves as a connection (or RRC connection) for signaling with respect to a plurality of cells (CCs), and is a special CC for managing UE context which is connection information related to the UE. Further, when the PCell (PCC) establishes the connection with the UE and thus is in an RRC connected mode, the PCC always exists in an activation state. A SCell (secondary serving cell) is a resource assigned to the UE other than the PCell (PCC). The SCell is an extended carrier for additional resource assignment, etc., in addition to the PCC, and can be divided into an activation state and a deactivation state. The SCell is initially in the deactivation state. If the SCell is deactivated, it includes not transmit sounding reference signal (SRS) on the SCell, not report channel-quality indicator (CQI)/precoding matrix indicator (PMI)/rank indicator (RI)/procedure transaction identifier (PTI) for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARM). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUCCH) that carries user data is allocated in the frequency domain.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a channel quality indication (CQI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system. PUCCH format 3 can be used to enable the possibility of transmitting more than four bits in an efficient way, even though PUCCH format 3 also be used for transmitting less four bits of signal. The basis of PUCCH format 3 is DFT (Discrete Fourier Transform)-precoded OFDM. Up to five terminals may share the same resource-block pair for PUCCH format 3 when a length-5 orthogonal sequence is used with each of the five OFDM symbol carrying data in a slot being multiplied by one element of the sequence. A terminal (eNB and/or UE) can be configured with more than one resource (e.g. four different resources) for PUCCH format 3.

Herein, an ePDCCH can be one of solutions of limitation for a PDCCH transmission or new control information transmission of near future communication system including a new type of carrier as shown in FIG. 4.

FIG. 4 shows downlink control channels to which the present invention is applied. The ePDCCH which can be multiplexed with the PDSCH can support multiple Scells of the CA.

Referring to FIG. 4, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in multimedia broadcast single frequency network (MBSFN) subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where a cell-specific common reference signal (CRS) may be omitted in some subframes or physical broadcast channel (PBCH) may not be transmitted.

FIG. 5 shows an example of dual connectivity to a macro cell and a small cell. Referring to FIG. 5, the UE is connected to both the macro cell and the small cell. A macro cell eNB serving the macro cell may be called as a MeNB in dual connectivity, and a small cell eNB serving the small cell may be called as a SeNB in dual connectivity.

The MeNB is an eNB which terminates at least S1-MME and therefore act as mobility anchor towards the core network (CN) in dual connectivity. If a macro eNB exists, the macro eNB may function as the MeNB, generally. The SeNB is an eNB providing additional radio resources for the UE, which is not the MeNB, in dual connectivity. The SeNB may be generally configured for transmitting best effort (BE) type traffic, while the MeNB may be responsible for transmitting other types of traffic such as VoIP, streaming data, or signaling data.

FIG. 6 shows an example of a protocol architecture supporting dual connectivity. To support dual connectivity, various protocol architectures have been studied.

Referring to FIG. 6, PDCP and RLC entities are located in different network nodes, i.e., PDCP entities in the MeNB and RLC entities in the SeNB. In the UE side, the protocol architecture is same as the prior art except that the MAC entity is setup for each eNB (i.e., the MeNB and SeNB).

Meanwhile, one of the objectives of dual connectivity is to reduce hand-over overhead and core network signaling overhead when a UE is moving around a set of small cells where small cells are densely deployed. Dual connectivity becomes so effective particularly when a UE has both macro-cell coverage and small-cell coverage where macro-cell takes responsibility on user mobility handling. When considering a macro cell is congested or there is no macro-coverage, it is yet to address how to handle potentially frequent hand-over among small cells where a UE moves around small cells.

The invention(s) in this disclosure provide(s) method(s) to expand dual connectivity to a small cell and a virtual cell where a virtual cell consists of a set of small cells. To form a virtual cell without affecting legacy UEs or UEs served by each cell, the invention(s) in this disclosure first propose(s) to form a virtual cell which only uses a subset of subframes, for example, MBSFN subframes.

The MBSFN subframe may support MBSFN transmission. Further, MBSFN subframes may be used as a generic tool and not related only to MBSFN transmission. An MBSFN subframe may comprising a control region of length equal to length of one or more OFDM symbols followed by an MBSFN region whose contents depend on the usage of the MBSFN subframe.

FIG. 7 briefly describes an exemplary usage of virtual cell via MBSFN subframe according to the present invention.

As shown in FIG. 7, there are three UEs in the example of FIG. 7, then we can consider to form three virtual cells. Let these three virtual cells as virtual cell 1 (VC1), virtual cell 2 (VC2) and virtual cell 3 (VC3) respectively for each UE.

In this example, it is assumed that VC1 uses second subframe in every radio frame, VC2 uses the third subframe in every radio frame and VC3 uses the fourth subframe in every radio frame, respectively.

Referring to FIG. 7, Cell2 belongs to both VC1 and VC2 and thus it configures $2^{nd}$ and $3^{rd}$ subframe as MBSFN subframe whereas Cell5 belongs to all three VCs and thus configure $2^{nd}$, $3^{rd}$ and $4^{th}$ subframe as MBSFN subframes.

FIG. 8 briefly describes an example of dual connectivity according to the present invention.

FIG. 8 explains how a UE is received data from both physical cell and virtual cell respectively. Referring to FIG. 8, a UE may be configured to receive channels/data regarding control plane (C-plane) from a virtual cell. The virtual cell provides an overlaid network coverage of collaborating small cells by for example collaborating transmission from the participating cells.

For example, the virtual cell may transmit C-Plane data in MBSFN via SFN. Control Information for PDSCH may be transmitted on EPDCCH of virtual cell.

In downlink subframes other than subframes used by virtual cell(s), each cell may transmit data same as legacy procedure (e.g., non-single frequency network (SFN) transmission) and each cell in MBSFN configuration may transmit data in SFN-manner if that MBSFN subframe is configured or determined as a subframe used by virtual cell which the cell is participating.

Thus, in MBSFN subframe ($2^{nd}$ subframe), cell1, cell2, cell3 and cell4 may transmit RS, data, and other signals via SFN manner. For example, EPDCCH transmitted by virtual cell1 would be transmitted by four cells simultaneously.

It is also feasible to assign more than one virtual cell related region in one subframe as shown in FIG. 9.

FIG. 9 briefly describes an example of virtual cell region in time/frequency domain according to the present invention. Referring to FIG. 9, signals are transferred via virtual cells at MBSFN subframes. Further, VC1 and VC2 are assigned in a same MBSFN subframe.

In other words, a virtual cell is formed based on time/frequency resource where at least reference signals and/or synchronization signals from a virtual cell are transmitted at the given time/frequency resource declared by the virtual cell.

For a legacy UE or a UE which is not supporting this virtual cell, dual connectivity may be served by each cell as before if the UE supports dual connectivity in one frequency. Advanced UEs supporting this virtual cell can be attached to the virtual cell as a serving cell and can be attached to each physical cell as a secondary cell or as an assisting cell/carrier. When a UE supports this dual connectivity, cell search and RRM measurement can be occurred for virtual cell as well.

FIG. 10 briefly describes an example of initial access diagram according to the present invention. In the example of FIG. 10, discovery signal (such as primary synchronization signal (PSS)/secondary synchronization signal (SSS)/CRS) is transmitted in SFN manner and system information is SFN-transmitted as well. Here, initial access process based on the present invention is described referring to FIG. 10.

For PRACH transmission, a UE may transmit a PRACH which is heard by cells within the virtual cell where PRACH response may be propagated by the cell with lowest cell ID within the virtual cell. In a virtual cell, transmitting data to a UE can have multiple choices such as (1) to (4) as below.

(1) (E)PDCCH and PDSCH single frequency networked (SFN-ed) transmission (i.e. transmission in SFN manner): All transmission can be SFN transmitted. This would be useful particularly when small cells are connected via ideal backhaul. However, even without non-ideal backhaul, if it is coordinated among cells on control and data information, particularly, for a semi-static data such as RRC signaling, still, SFN manner transmission is feasible.

(2) (E)PDCCH SFN-ed transmission: Only (E)PDCCH transmission can be done in SFN manner. Data transmission can be done by a cell.

(3) Only (E)PDCCH CSS SFN-ed transmission: Only (E)PDCCH, CSS, DCIs may be transmitted in SFN manner. Other transmission can be done by each cell.

(4) Only (E)PDCCH CSS and PDSCH scheduled by CSS SFN-ed transmission

When channels are transmitted in SFN manner, data demodulation RS is also transmitted in SFN manner. For example, if demodulation reference signal (DM-RS) is used, DM-RS may be transmitted by multiple cells simultaneously as well. In this case, scrambling sequence/generation can be based on virtual cell ID rather than a physical cell ID. A separate scrambling ID can be also configured by higher layer if needed.

In addition, a new signal may be used for discovery signal. If PSS/SSS/CRS is used, the periodicity of PSS/SSS/CRS may be changed as 5 msec periodicity may not be achievable. For example, if only one subframe per radio frame is used for virtual cell, the minimum periodicity of discovery signal would be 10 msec. If there are more than one time/resource locations used by one virtual cell, only one resource may carry PSS/SSS, and CRS may be transmitted in every occasion of resource used by the virtual cell.

A UE supporting dual connectivity between virtual cell and physical cell proposed in this application may perform both cell searches assuming 5 msec synchronization signal periodicity and assuming different periodicity to identify virtual cells. Or, a UE may with higher priority first search the virtual cells, and then search physical cells if virtual cell has not been identified. When a virtual cell is identified and a UE is associated with the virtual cell, similar to dual connectivity procedure, a UE performs measurement and cell detection to identify potential physical cells for SCG configuration.

When PSS/SSS/CRS is used for virtual cell synchronization signals, the cell ID will be different from physical cell IDs so that a UE can be attached with two different cell IDs for dual connectivity.

For control channel and data channel single frequency networked (SFN-ed) transmission, let's consider (E)PDCCH SFN transmission first which is the most attractive approach as the current mechanism assumes that a cell transmitting PDCCH is considered as a serving cell. To make a virtual cell to be a serving cell for a UE, it would be natural to transmit control channel by the virtual cell (which is SFN transmission).

To support SFN-ed (E)PDCCH transmission, each cell within a virtual cell should transmit the same (E)PDCCH data. Thus, some coordination among small cells would be necessary to enable SFN (E)PDCCH transmission. To have SFN transmission, the following information 1) to 4) should be aligned.

1) The same resource-configured EPDCCH PRBs or the number of OFDM symbols used for PDCCH should be aligned. For PDCCH, as resource usable by one virtual cell is limited, the same PRBs where PDCCH spans needs to be aligned among cells as well.

2) The same search space used for a given UE.

3) The same aggregation level used for a given UE.

4) The same content of DCI for a given UE.

To support this, each small cell exchanges the list of UEs, scheduling information, resource allocation, modulation and coding scheme (MCS), etc semi-statically. One way is to assign a master cell within the virtual cell for each UE which decides the scheduling information for the UE and the information will be propagated to other small cells so that the same (E)PDCCH can be produced and transmitted. In terms of common-search space, data such as system information may be shared among small cells within a cluster which will be configured by a cluster master cell.

In terms of transmitting control channels, two approaches are possible. First approach is to use legacy PDCCH region where legacy signals such as PCFICH, PHICH and others should be handled properly to support SFN transmission. Another approach is to use EPDCCH like approach where SFN-ed PDCCH transmission may be transmitted separately from legacy PDCCHs. If the second approach is used, an EPDCCH set should be pre-configured or configured by master information block (MIB)/system information block (SIB) which a UE can read for virtual cell control channels. The set can be reconfigured by higher layer signaling.

Assuming legacy PDCCHs is used and SFN-ed transmission of PDCCHs from multiple physical cells are occurred, there could be multiple options to handle UEs reading the region and/or generate reference signals such as CRS to read PDCCH.

In terms of handling UEs accessing PDCCHs from virtual cell, there could be different options feasible. First, it may be assumed that any UE is not expecting to read "CRS" in the subframe where PDCCH transmission by virtual cell can be occurred. This can be handled via measurement configuration where potentially two or more sets of measurement configurations can be feasible where first set is configured to monitor channel quality on virtual cells and the second set can be configured to monitor channel quality on physical cells and additionally more configurations can be configured to further divide measurement subframes for physical cells (such as almost blank subframe (ABS) configurations).

Thus, a UE should not expect to read CRS or use CRS for measurement in the first set of measurement subframe set. Rather, a UE may use MBSFN-RS or a new RS defined such as CSI-RS for the measurement of the first set. The measurement RS used for virtual cell can be also used for a coarse time/frequency tracking as well.

Further, it can be also considered that physical cells may transmit "synchronized" discovery signals which can be used for UE measurement on the second set (or the others) for the measurement on the physical cells. The measurement sets can be configured by the initial serving cell which UE has made initial cell association.

Second approach is to utilize CRS for virtual cell measurement as well. In this case, however, a UE needs to know the list of cells consisting of the target virtual cell so that it may take average over CRSs transmitted by cells forming the same virtual cell.

For example, if four cells (Cell1, Cell2, Cell3, and Cell4) consist of a virtual cell (VC1), then a UE may read all CRSs scrambled by Cell1/Cell2/Cell3/Cell4 and then can take average or other processing to perform radio link monitoring related measurement. Alternatively, within a same subframe, depending on the OFDM symbol, either CRS or new RS or MBSFN-RS can be used for measurement.

Similarly, to handle SFN-ed control channel transmissions, which RS will be used for data demodulation and time/frequency tracking can have multiple choices i.e. alternatives (i)~(v) as follows.

(i) Alt1. Use cell-specific CRS: Using this approach, a UE may perform channel estimation to read PDCCH using individual CRS from each physical cell. If a UE knows the list of physical cells which forms a virtual cell, it may assume that all the CRS REs used for each cell are rate-matching around those REs. Using this approach, a UE which is trying to read individual PDCCH for each cell may not be able to successfully read PDCCH due to different rate matching and CRS RE assumption. To allow frequency division multiplexing (FDM) between more than one virtual cell in a same subframe, it can be also considered that a UE is configured with a list of cells which will transmit CRS in the subframe of virtual cell PDCCH transmission. Or, a UE is configured with a set of CRS positions which will be used for rate matching on PDCCH transmission. In terms of tracking and data demodulation, only CRSs from cells forming the target virtual cell are assumed to be used.

Another option is to allow UE blind detection of a list of CRS, then it transmits the list of CRS detected to the initial serving cell so that the serving cell determines which REs will be rate-matched for PDCCH transmission. The detected CRS will be used for channel estimation and/or time/frequency tracking. Without UE feedback, it is also feasible that eNB assumes the worst case of CRS REs among neighboring cells, and then rate matching PDCCH transmission around those REs. Another approach is that a UE should take the strongest CRS and use it for channel estimation and/or time/frequency tracking. In this case, channel estimation could be inaccurate.

Another approach is to align CRS transmission in terms of resource and scrambling using virtual cell ID rather than using physical cell ID. In other words, CRS transmission can be SFN-ed as well.

(ii) Alt2. Use MBSFN-RS: Another approach is to use MBSFN-RS for data demodulation for PDCCH. Here, in terms of RS rate matching, all CRS REs used by cells forming a virtual cell may be assumed as used and thus PDCCH is rate-matched around those CRS REs. Alternatively, it can be assumed that CRS transmission may not be occurred in that region and thus a UE may assume that PDCCH can be transmitted in REs assigned to CRS for a cell. When MBSFN-RS is used, extended CP can be assumed to be used for PDCCH transmission as well for virtual cell. Or, a new MBSFN-RS pattern on normal CP can be also considered.

A candidate RS pattern of MBSFN-RS on normal CP would be to place MBSFN-RS in OFDM symbol #2 in first slot and OFDM symbol #0, #5 in second slot with keeping the same sub-carriers as per FIG. 6.10.2.2-1 of 3GPP Rel-11 TS 36.211. A UE shall use interpolation and extrapolation for channel estimation using MBSFN-RS. Scrambling may be done using virtual cell ID. Related to using MBSFN-RS, it can be also considered to configure a virtual cell via MBMS configuration where MBMS configuration is rather UE-specific and signaled by higher layer via UE-specific manner. Payload and content may follow current MBMS configurations including MBMS area/service configuration. It is however assumed that MBSFN-RS pattern with 7.5 kHz channel spacing is not used.

(iii) Alt3. Use DM-RS: Another approach is to use DM-RS for data demodulation for PDCCH. In this case, DM-RS is assumed to be scrambled with virtual cell ID and precoding is fixed.

(iv) Alt4. Use new RS: Another approach is to design a new RS for data demodulation for PDCCH for virtual cell.

(v) Alt5. Use PRS: Another option is to use positioning reference signal (PRS) for data demodulation and/or time/frequency tracking. In this case, cell ID can be virtual cell ID and scrambling may be changed. In terms of bandwidth of PRS transmission, it can be assumed that the entire bandwidth may carry PRS if it is used for data demodulation of PDCCH.

Assuming EPDCCH is used, EPDCCH configuration and the used RS for control data demodulation (and also RE mappings) should be coordinated among cells within a same virtual cell. If EPDCCH is used, it may be assumed that two OFDM symbols are used for physical cell PDCCH transmission and thus EPDCCH can be transmitted from $3^{rd}$ OFDM symbols.

Instead of SFN-ed transmission of EPDCCH in the same resource, it is also feasible that EPDCCH is transmitted from each physical cell separately where a UE aggregate multiple EPDCCHs for decoding control channels. Also, if EPDCCH is transmitted over different PRBs from different cells, a UE can use DM-RSs transmitted from each cell for channel estimation and time/frequency tracking jointly. Alternatively, when EPDCCH is used, a UE can assume that the starting OFDM symbol is zero (0) where any other signals except for data demodulation RS for EPDCCH (DM-RS or CRS) is assumed for rate matching.

FIG. 11 describes briefly another example of accessing a virtual cell according to the present application.

In the example of FIG. 11, a UE searches a cell according to legacy procedure where a UE is configured with a VC and the resource information which will be used for handling the RRC connection.

Using this approach, a UE performs the initial cell search to identify a physical cell. Another option of handling mobility is to utilize CoMP scenario 4 such as 3GPP TS 36.300.

PDSCH Transmissions for Physical Cells

So far, we have looked at (E)PDCCH transmission for a virtual cell. Given that a UE can receive PDSCH from each physical cell, scheduling DCI can be transmitted with multiple feasible options such as (a) and (b) as below.

(a) Separate PDCCH: In this case, a separate PDCCH transmitted in the same subframe where PDSCH is transmitted by the physical cell. For (E)PDCCH transmission, it can follow 3GPP Release-11 technical specification (or 3GPP Release-12 technical specification) to generate (E)PDCCH.

Thus, from a UE perspective, two different signaling generation including both PDCCH and CRS may be expected to read (E)PDCCH from a virtual cell and (E)PDCCH from a physical cell. Given separate PDCCH transmission from each physical cell, a UE may not know which physical cell is going to transmit PDCCH to the UE at a given subframe.

One simple approach is to perform blind decoding for all cells in the same virtual cell or a UE can be configured with a cell which will transmit PDSCHs.

Another approach is that PDCCH from the virtual cell may indicate a pattern of data transmission in a radio frame or over a certain period over the next few subframes/radio frames where a UE is expected to receive PDSCHs.

For example, if only one subframe is used for PDCCH transmission from a virtual cell in every radio frame, PDCCH may indicate a pattern of PDSCH transmitter within a radio frame which will be effective in 4 msec (or other latency). Dynamic indication can be given whenever the pattern changes.

(b) Cross-subframe from virtual cell PDCCH transmissions: Another option is to allow PDCCHs only in subframes used for virtual cell PDCCH transmissions. PDSCHs can be scheduled via cross-subframe scheduling. If this is used, some coordination of resource and other information to schedule a data should be coordinated before.

Reconfiguration of Virtual Cell

Given that a UE moves, the list of cells forming a virtual cell also changes. There could be multiple approaches to determine or select a set of cells to be added or removed from a virtual cell.

First option is to use "discovery signal" or radio resource measurement results to identify a few (e.g., top four) strongest cells which can be used for a virtual cell for a given UE.

Assuming a physical cell representing or in charge of a virtual cell as a leader of VC (VC_leader), VC_leader can be a cell which transmits PDSCHs to the UE and perform resource handling and coordination. VC_leader may also take in charge of adding or removing cells from the virtual cell. If VC_leader is removed from the list, it may hand-over to another cell of leadership functions.

Via backhaul signaling, addition and removal of a cell can be performed where a newly added cell should start transmission of SFN-ed PDCCH transmissions for the UE in a subframe/region used for the virtual cell PDCCH transmissions. When a cell cannot join the other virtual cell due to conflict resource between multiple virtual cells which is participating, it may inform the leader. When there is no cell which can continue the service for the UE, the UE may be hand-overed to different virtual cell.

Discontinuous Reception (DRX)

To reduce the terminal power consumption, discontinuous reception (DRX) may be performed. DRX may be performed with a configurable DRX cycle in the terminal. With a DRX cycle configured, the terminal monitors the downlink control signal only in one subframe per DRX cycle, sleeping with the receiver circuitry switched off in the remaining subframes. Naturally, this implies that the scheduler as the terminal can be addressed only in the active subframes.

In terms of DRX handling, a multiple approaches such as (i)~(v) as below can be considered. As it relates to the UE requirement on radio link monitoring (RLM), depending on RLM option, DRX cycle configuration can be also determined. For example, if RLM is performed only for virtual cell, DRX cycle is used only for virtual cells as well. If RLM is performed for both virtual and physical cells, DRX cycles should also consider both cases.

(i) Align DRX cycle with virtual cell transmissions so that a UE can wake up and read PDCCH transmission from a virtual cell.

(ii) A UE should count only subframes where virtual cell PDCCH transmission is scheduled for ON-duration.

(iii) A UE should not wake-up subframes where virtual cell PDCCH transmission is not scheduled.

(iv) A UE should count only subframes where virtual cell PDCCH transmission is scheduled for deciding DRX cycle (for inactivitytimer, onduration and drxcycle) so that depending on the periodicity of virtual cell PDCCH transmission, overall DRX cycle will be enlarged.

(v) Separate DRX cycles for virtual cell and a physical cell: On top of long-DRX cycle, another DRX cycle for virtual cell can be configured which may use one of the options listed in above (1)-(4). A UE behave differently for each DRX cycle. For example, in-sync and out-of-sync decision can be maintained for both virtual cell and physical cell where out-of-sync on virtual cell incurs "RLF" whereas out-of-sync on physical cell incurs signaling/indication to the serving cell only without incurring RLF. If this approach is used, in terms of counting subframes, each DRX cycle should count for subframes used for virtual cell and physical cells respectively. A UE expects to receive PDCCH from virtual cell or physical cell respectively for each DRX cycle configured for virtual cell and physical cell.

Paging

As virtual cell maintains the connectivity/mobility of a UE, it is also desirable to use virtual cell to page a UE. On the other hand, however, a virtual cell may not be easily configurable when a UE is in RRC_IDLE mode. In RRC_IDLE mode, no RRC context is established and the UE does not belong to a specific cell. No data transfer may take place as the UE sleeps most of the time. In this case, fall-back to physical cell can be also considered where paging would be occurred for physical cells.

If paging occurs in a unit of virtual cell, paging will be transmitted in a SFN manner and the paging cycle and subframes would be configured differently from legacy paging cycles/offset so that paging can be occurred in a subframe where PDCCH transmission from a target virtual cell can be handled. Alternatively, a unit of paging can be a set of physical cells where physical cells align paging cycle for the UE and transmit paging data in a SFN manner.

PCFICH and PHICH for Virtual Cell

A UE may assume that PCFICH and PHICH for virtual cell transmission would not be used. Thus, when mapping resources for PDCCH, REs reserved for PCFICH and PHICH may be used for PDCCH transmissions. Or, PCFICH and PHICH REs reserved for the VC_leader may be assumed to be "not used" for virtual cell PDCCH transmission.

In general, the points discussed in this invention can be summarized such as ①~④ as follows.

① If there is no legacy UE assumed in small cell layer where this invention applies, this invention proposes to take frequency division multiplexing (FDM) and/or time division multiplexing (TDM) approach to differentiate resources for virtual cells and physical (or individual) cells. When there is legacy UEs in small cell layer where this invention applies, the TDM can be further specified or limited to include MBSFN subframes used for virtual cells so that the impact on legacy UEs can be minimized.—It is also feasible to allow more than one virtual cells in the same subframe via FDM in addition to TDM approach.

② From a UE measurement perspective, a separate measurement can be performed on virtual cell and physical cell. More specifically, RLF/handover/cell reselection may be handled by virtual cell measurement whereas configuring individual cell as assisting eNB or SCell can be based on measurement on physical cells.

③ Further, separate or different handling of DRX and paging is proposed.

④ It also proposes to handle PDCCH transmission from multiple physical cells forming a virtual cell via SFN manner and proposes different options for data demodulation RS.

Further Optimization of TDM/FDM Without Legacy UE Consideration

Assuming legacy UE is not allowed in a small cell layer, there could be further optimizations considerable. It may be assumed that a set of virtual cells in a small cell cluster transmit necessary signaling such as SIB/MIB/synchronization signals for UE cell selection and measurement.

For example, a virtual cell may transmit common signals in every 10 msec or 5 msec where individual cells may not transmit any common signal except for common signals for virtual cells. A UE selects virtual cell based on measurement. It may be assumed that individual cell may not transmit any cell-common RS/signals unless a UE is configured with CRS-based transmission modes for SCell or assisting eNB (as a individual cell). Virtual cell may transmit CRS or RS which can be used for measurement and time/frequency tracking, which will be transmitted in a SFN-manner.

It is also possible that from a UE perspective, a DRX-like configuration is given such that UE is supposed to monitor (E)PDCCHs from virtual cell on Onduration and can monitor (E)PDCCH from individual cell on other subframes unless DRX is configured. In other words, a UE may be configured with a set of subframe configured to monitor virtual cell (E)PDCCH and individual cell (E)PDCCHs via higher layer signaling.

FIG. 12 is a flowchart briefly describing an operation of a UE according to the invention(s) in this disclosure.

Referring to FIG. 12, the UE may receive signals from cells at step S1210. The cells may be configured with dual connectivity. Among cells configuring dual connectivity, one cell is macro cell and at least one cell is a virtual cell. Control channel of the virtual cell is transmitted at MBSFN subframe and demodulated with reference signal. Deferent from a physical cell, the control channel of the virtual cell may be demodulated with CRS, MBSFN-RS or DM-RS. The details are same as explained before.

The UE may transmit signals to cells at S1220. As said, The cells may be configured with dual connectivity. And the detailed operation with virtual cell in dual connectivity is described above.

FIG. 13 is a block diagram which briefly describes a wireless communication system including an UE 1300 and a BS (eNB) 1340. The UE 1300 and the BS 1340 may operate based on the description as explained above.

In view of downlink, a transmitter may be a part of the BS 1340 and a receiver may be a part of the UE 1300. In view of uplink, a transmitter may be a part of the UE 1300 and a receiver may be a part of the BS 1340.

Referring to FIG. 13, the UE 1300 may include a processor 1310, a memory 1320 and a radio frequency (RF) unit 1330.

The processor 1310 may be configured to implement proposed procedures and/or methods described in this application. For example, the processor 1310 may demodulate or scrambling data from virtual cell.

The memory 1320 is coupled with the processor 1310 and stores a variety of information to operate the processor 1310, which includes data information and/or control information.

The RF unit 1330 is also coupled with the processor 1310. The RF unit 1330 may transmit and/or receive a radio signal. The signal may include a discovery signal when the signal is transmitted from the eNB in off-state.

The BS 1340 may include a processor 1350, a memory 1360 and a RF unit 1370. Here, the BS may be PCell or SCell and the BS may be a macro cell or small cell. In addition the BS may be a source cell for network synchronization or a target cell for network synchronization.

The processor 1350 may be configured to implement proposed procedures and/or methods described in this application. For example, the processor 1350 may perform scheduling with other virtual cell which constructs dual connectivity.

The memory 1360 is coupled with the processor 1350 and stores a variety of information to operate the processor 1350, which includes data information and/or control information. The RF unit 1370 is also coupled with the processor 1350. The RF unit 1370 may transmit and/or receive a radio signal. The signals transmitted or received via the RF unit 1370 are also described before.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

The invention claimed is:

1. A user equipment (UE) for supporting dual connectivity with a small cell and a virtual cell, the UE comprising:
   a radio frequency (RF) unit configured to transmit and receive a radio signal; and
   a processor, operatively coupled to the RF unit, that:
   attaches the virtual cell as a serving cell in the dual connectivity, wherein the virtual cell overlapped with the small cell is formed by combining the small cell and a plurality of neighboring cells of the small cell;
   attaches the small cell as a secondary cell in the dual connectivity, wherein the small cell is a cell in which the UE is located;
   controls the RF unit to receive control plane data at a multimedia broadcast single frequency network (MBSFN) subframe, from the virtual cell; and
   controls the RF unit to receive user plane data, from the small cell,
   wherein a cell identity (ID) of the virtual cell is different from a physical cell ID of the small cell when a primary synchronization signal (PSS), a secondary synchronization signal (SSS) or a cell-specific common reference signal (CRS) is used as a synchronization signal for the virtual cell, and
   wherein the virtual cell supports maintaining a control plane of the UE.

2. The UE of claim 1, wherein the processor:
   controls the RF unit to transmit the control plane data, to the virtual cell; and
   controls the RF unit to transmit the user plane data, to the small cell.

3. The UE of claim 1, wherein the processor:
   derives a cell ID of the small cell using synchronization signal; and
   uses an MBSFN reference signal as a reference signal for demodulating the control plane data received from a control channel of the virtual cell.

4. The UE of claim 1, wherein the processor:
   derives a cell ID of the small cell using a synchronization signal; and
   uses a demodulation reference signal as a reference signal for demodulating the control plane data received from a control channel of the virtual cell.

5. The UE of claim 1, wherein the processor:
   performs rate-matching for a CRS resource element when a CRS is used for demodulating the control plane data received from a control channel of the virtual cell.

6. The UE of claim 1, wherein the UE supports the dual connectivity with a first cell having a cell ID that is different from the physical cell ID of the small cell, and
   wherein the control plane data of the virtual cell and data of the first cell are transmitted at a same MBSFN subframe.

7. A method for supporting connectivity with a small cell and a virtual cell, by a user equipment (UE), the method comprising:
   attaching the virtual cell as a serving cell in the dual connectivity, wherein the virtual cell overlapped with the small cell is formed by combining the small cell and a plurality of neighboring cells of the small cell;
   attaching the small cell as a secondary cell in the dual connectivity, wherein the small cell is a cell in which the UE is located;

receiving control plane data at a multimedia broadcast single frequency network (MBSFN) subframe, from the virtual cell; and receiving user plane data, from the small cell, wherein a cell identity (ID) of the virtual cell is different from a physical cell ID of the small cell when a primary synchronization signal (PSS), a secondary synchronization signal (SSS) or a cell-specific common reference signal (CRS) is used as a synchronization signal for the virtual cell, and wherein the virtual cell supports maintaining a control plane of the UE.

8. The method of claim 7, further comprising:

transmitting the control plane data, to the virtual cell; and transmitting the user plane data, to the small cell.

9. The method of claim 7, wherein a cell ID of the small cell is derived using a synchronization signal, and wherein an MBSFN reference signal is used as a reference signal for demodulating the control plane data received from a control channel of the virtual cell.

10. The method of claim 7, wherein a cell ID of the small cell is derived using a synchronization signal, and wherein a demodulation reference signal is used as a reference signal for demodulating the control plane data received from a control channel of the virtual cell.

11. The method of claim 7, wherein rate-matching for a CRS resource element is performed when a CRS is used for demodulating the control plane data received from a control channel of the virtual cell.

12. The method of claim 7, wherein dual connectivity is supported with a first cell having a cell ID that is different from the physical cell ID of the small cell, and wherein the control plane data of the virtual cell and data of the first cell are transmitted at a same MBSFN subframe.

\* \* \* \* \*